H. W. BULLARD.
Improvement in Saw-Mills.
No. 126,442.  Patented May 7, 1872.
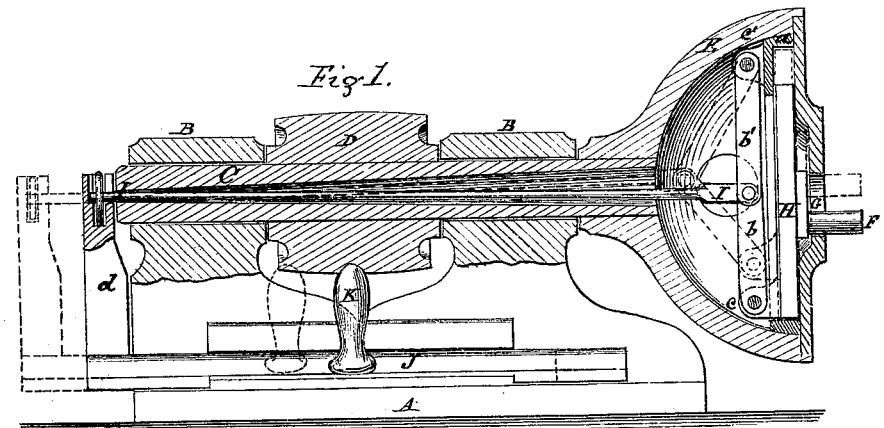
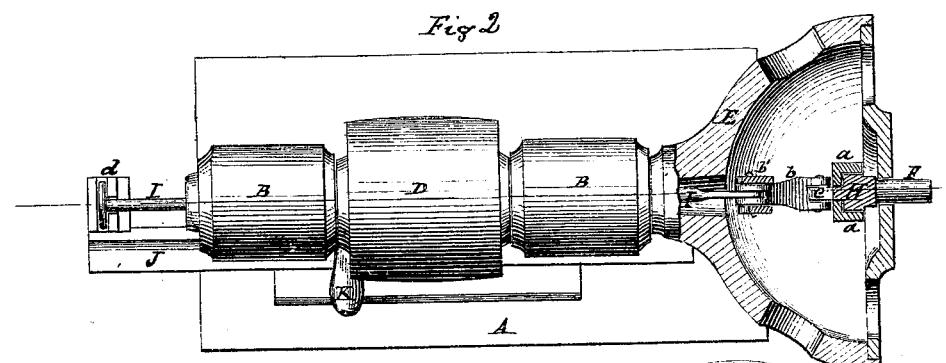
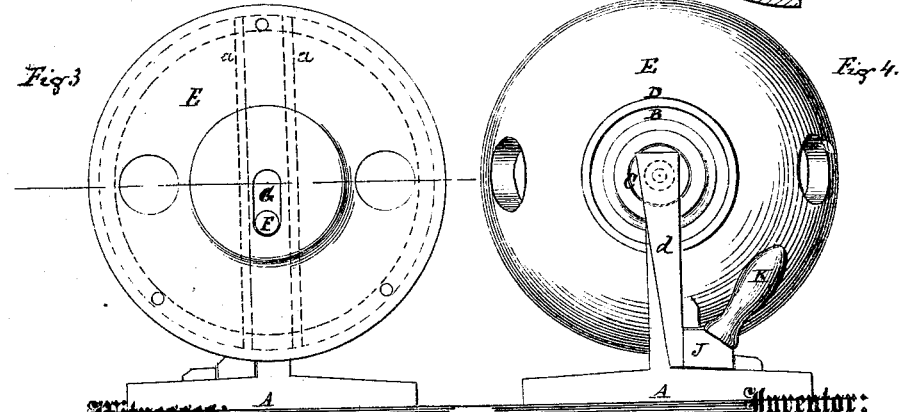

UNITED STATES PATENT OFFICE.

HENRY W. BULLARD, OF POUGHKEEPSIE, NEW YORK, ASSIGNOR TO HIMSELF AND JAMES H. DUDLEY, OF SAME PLACE.

IMPROVEMENT IN SAW-MILLS.

Specification forming part of Letters Patent No. 126,442, dated May 7, 1872.

Specification describing a new and useful Improvement in Adjustable Crank-Pins for Sawing and other Machinery, invented by HENRY WILLIAM BULLARD, of Poughkeepsie, in the county of Dutchess and State of New York.

The invention relates to the well-known adjustment of a crank-pin in a radial slot of the crank-wheel or pulley which rotates it; and consists in the combination therewith of the mechanism hereinafter fully described and pointed out in the claims.

In the present description of my invention I shall confine myself to its application to a jig-saw. The skilled mechanic will be enabled to make other applications without departing from my invention.

Figure 1 is a side sectional elevation of a jig-saw mandrel and crank-pin chuck or head, showing my improvement. Fig. 2 is a plan view of the same, in part sectional. Fig. 3 is a front elevation of the same. Fig. 4 is a rear elevation of the same.

Similar letters of reference indicate corresponding parts.

A is the mandrel or shaft rest or support; B, bearings of the shaft or mandrel; C, a hollow shaft or mandrel; D, driving-pulley, by which the mandrel is operated; E, crank chuck or head, which practically forms a part of the mandrel C, and is to be considered as an enlargement thereof; F, the adjustable crank-pin, to which the usual connecting-rod of the saw or saw-frame is attached.

In the ordinary construction of jig-saws the face of the crank-chuck is provided with several apertures placed at different distances from the center, in which apertures the crank-pin screws, the throw of the crank being changed or adjusted by stopping the machine and shifting the crank-pin from one to another of the said apertures.

In the present improvement the face of the crank-chuck is provided with only one aperture, made in the form of a slot, G, extending from the center of the chuck radially. The crank-pin F is made to slide within the slot G, and the throw of the crank is adjusted by moving the pin F toward or away from the center of the chuck. This adjustment of the pin F I effect by making the chuck E hollow, and upon the inside of the face thereof I provide guides or ways $a$, between which is arranged a sliding block or dog, H, to which the crank-pin F is attached. The dog H is operated by a toggle-lever, I, which passes longitudinally through the mandrel C. To the inner end of the lever I are jointed the toggle-arms $b\ b'$, one of which, $b'$, is jointed to a fixed ear, $c'$, on the guide $a$. The other arm, $b$, is jointed to an ear, $c$, on the dog H. When longitudinal motion is imparted to the lever I the arms $b\ b'$ will correspondingly open or close, and the movement of arm $b$ will actuate the dog H, causing it to move and carry the crank-pin F either toward or from the center of the chuck E. The stroke or throw of the crank-pin and of the connecting-rod thereto attached and the movement of the same are governed by the relative positions occupied by the pin F in respect to the center of the chuck. When the pin stands in the center of the chuck there will be no motion of the saw, although the mandrel may be in rapid rotation. But when the lever I is moved longitudinally so as to carry the pin F away from the center of the chuck, then the crank-pin F will have a throw in exact correspondence with such movement.

It is obvious that, instead of the lever and toggle-arms, other equivalent devices might be used to operate the crank-pin; as, for example, a chain might pass from the exterior of the mandrel through its center and connect with each end of the dog H, suitable rollers or guides being arranged within the head E to conduct the chain; but I prefer the lever and toggle-arms.

The outer extremity of the lever I projects from the hollow mandrel D, and to this extremity of the lever any suitable device may be attached to effect its convenient movement. In the present example I operate the lever I by means of a sliding bar, J, which moves in guides attached to the base A. The bar J is provided at its extremity with a vertical arm, $d$, which is connected with the extremity of the lever I, so that when the bar J is moved the lever I is also operated. K is a handle on the bar J, by which the latter is moved. Any suitable lock or fastening device may be attached to the bar J or base A to hold or lock the bar J and lever I in any desired position.

The position of the crank-pin may be shifted at any time, without stopping the mandrel, by simply moving the bar J, as described.

I do not limit or confine myself to the precise form or arrangement of any of the parts herein described, as these may be varied in many ways without departing from my invention.

Having thus described my invention, I claim as new and desire to secure by Letters Patent—

1. The mandrel C, having hollow slotted head and conical cavity, combined with the rod I, toggles, and sliding crank-block H, as and for the purpose described.

2. The combination, with rod I, of the sliding bar J and vertical bar $d$, as and for the purpose set forth.

HENRY WILLIAM BULLARD.

Witnesses:
   JAS. H. DUDLEY,
   MILTON SCOTT.